United States Patent [19]
Marcovitch

[11] 3,811,308

[45] May 21, 1974

[54] PROFILING OF WORKPIECES

[75] Inventor: Jacob Marcovitch, Johannesburg, South Africa

[73] Assignee: Rotary Profile Anstalt, Vaduz, Liechtenstein

[22] Filed: Sept. 20, 1972

[21] Appl. No.: 290,751

Related U.S. Application Data

[63] Continuation of Ser. No. 80,043, Oct. 12, 1970, abandoned, Continuation-in-part of Ser. No. 615,613, Feb. 13, 1967, Pat. No. 3,533,259.

[30] Foreign Application Priority Data

Feb. 14, 1966 South Africa.......................... 66/804

[52] U.S. Cl..................................... 72/210, 72/220
[51] Int. Cl........................... B21h 7/00, B21b 1/00
[58] Field of Search ............ 72/210, 220, 215, 115, 72/126; 425/374

[56] References Cited
UNITED STATES PATENTS

| 1,560,999 | 11/1925 | Corizon | 425/374 |
| 3,030,835 | 4/1962 | Krause | 72/214 X |
| 342,387 | 5/1886 | Sagendorph | 72/220 |
| 731,769 | 6/1903 | Gillen et al. | 72/220 |
| 3,199,327 | 8/1965 | Krause | 72/210 X |

Primary Examiner—Milton S. Mehr
Attorney, Agent, or Firm—Young & Thompson

[57] ABSTRACT

Workpieces of materials highly resistant to deformation or compaction but capable of plastic deformation under high pressure are subjected to transient, very high pressure applied to elements of the workpiece progressively, until the whole workpiece has been traversed. The pressure may be applied by a patterned formation which imposes its profile on the workpiece, or the workpiece may be kneaded into intimate contact with the pattern to receive its impress.

4 Claims, 70 Drawing Figures

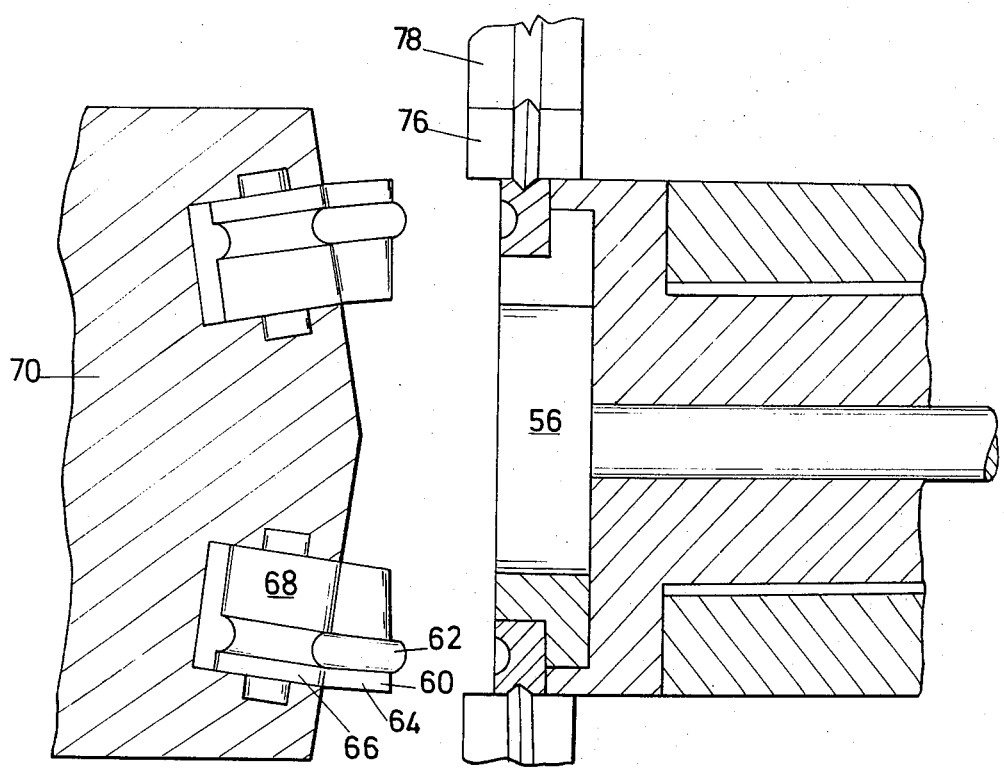
Fig. 6'
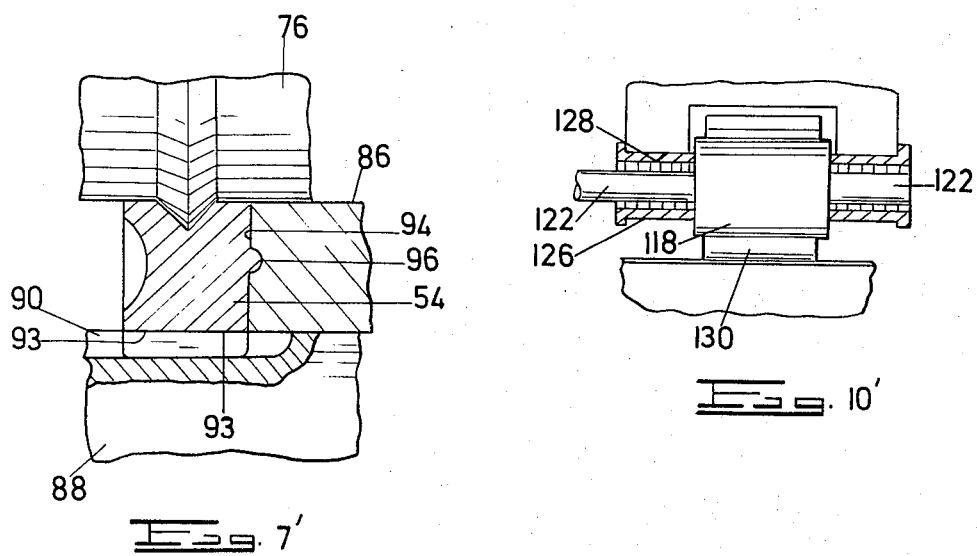
Fig. 7'
Fig. 10'

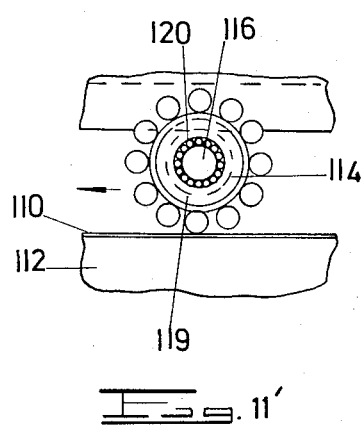
Fig. 11'
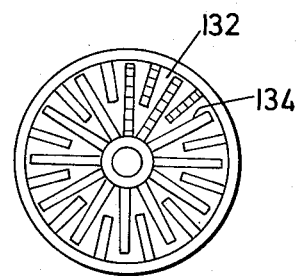
Fig. 12'
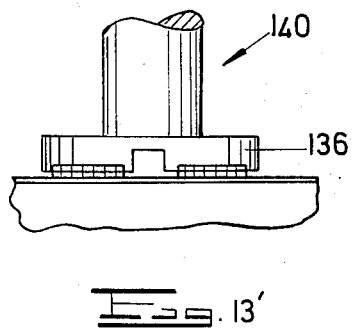
Fig. 13'
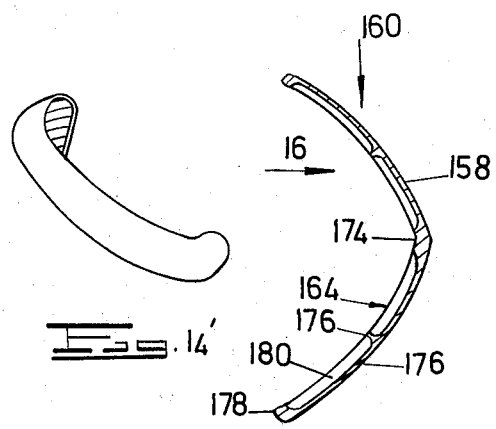
Fig. 14'
Fig. 15'
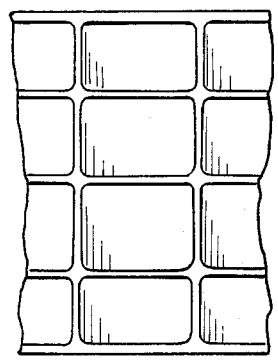
Fig. 16'
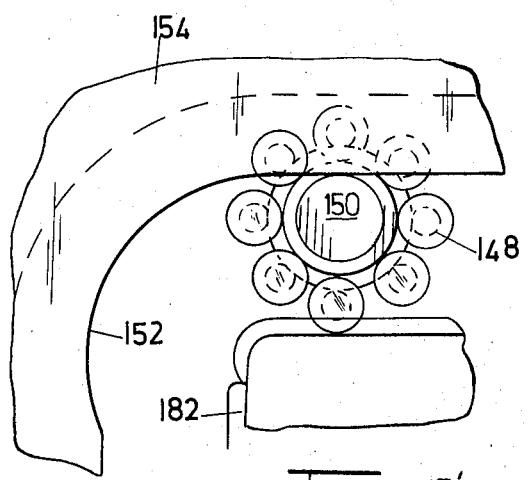
Fig. 17'

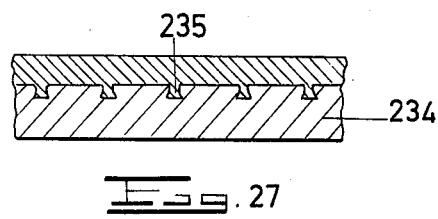
Fig. 27
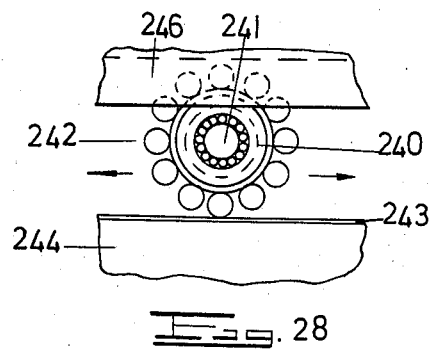
Fig. 28
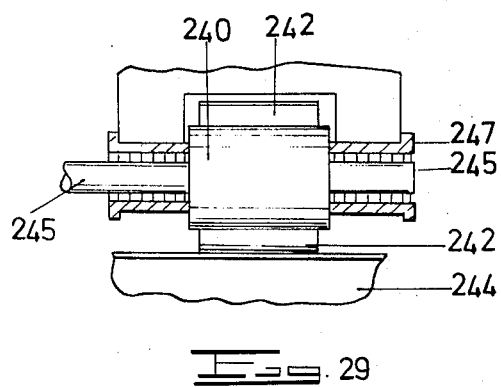
Fig. 29
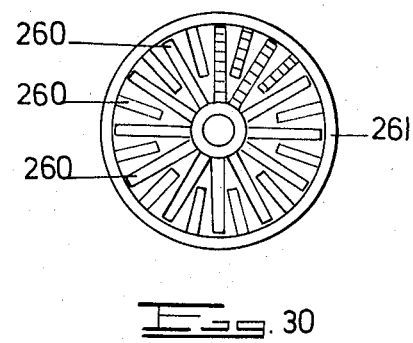
Fig. 30
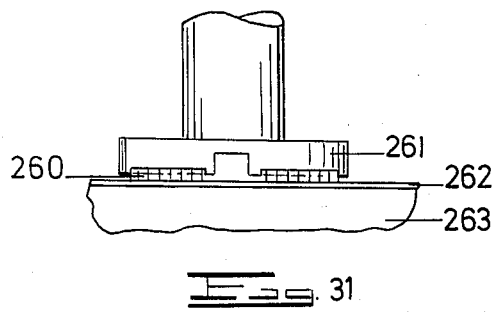
Fig. 31
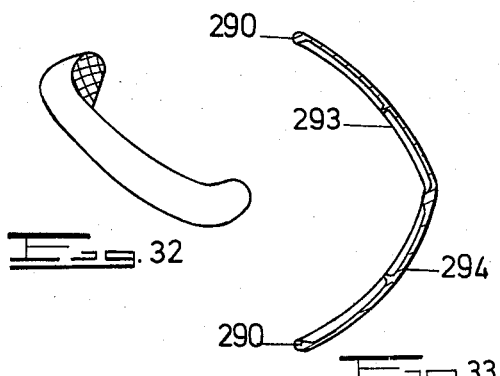
Fig. 32
Fig. 33
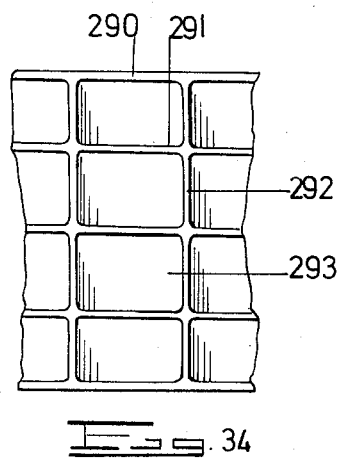
Fig. 34
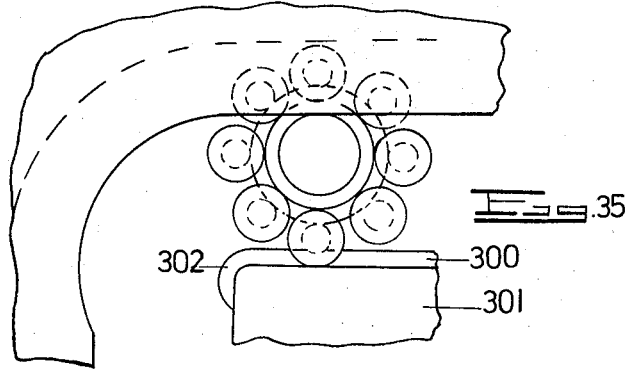
Fig. 35

PROFILING OF WORKPIECES

This is a continuation of application, Ser. No. 80,043, filed Oct. 12, 1970, now abandoned.

This application is a continuation-in-part of my application Ser. No. 615,613 filed Feb. 13, 1967 (U.S. Pat. No. 3,533,259) and it should be read in conjunction with it as the figures and descriptions are cross-referenced with it.

BACKGROUND TO THE INVENTION

Various industries, especially the metal-forming industry have placed great emphasis in recent times to seek means to replace time-consuming, costly and inadequate metal shaping means by other methods to achieve greater utilization of material and accuracy of finished parts. However, except for very small components such as produced by heading machines, the accepted way has been and still to date is the finishing of most metal shapes used in industry by cutting or other metal removing means.

It is known to roll components by spinning operations and ironing operations and to hot roll certain annuli, for example, but except for rolling mills which are restricted to rolling linear products in any case, these processes are not effective for producing finished components.

In the known rolling processes for producing components the rolling takes place under light pressure with the workpiece usually in the hot state. The known rolling processes are usually light operations with the main deformation of the workpiece taking place on that surface of the workpiece which is contacted by the roller. These processes do not induce or are not capable of inducing flow, especially on thick workpieces, of the workpiece at the side remote from the roller and normally held against a die Q.

OBJECTS OF THE INVENTION

Another main object of the invention is to considerably advance the state of the art by a localized high-pressure intensity rolling means (i) to achieve greater part definition, greater utilation of material, (ii) to enhance the physical properties of the material in most instances in so doing and (iii) to substantially reduce the cost of manufacturing and the capital equipment employed.

The main object of the invention is to achieve a type of flow by the use of the high-pressure method such that if a die is employed with very fine details, of the nature used in coining dies, the full detail will be imparted to the workpiece, usually in the cold state, on the side of the workpiece remote from that against which the roller rolls.

SUMMARY OF THE INVENTION

The type of rolling contemplated by the invention, viz. in order to induce flow against the die on the face of the workpiece opposite to the roller, is of the nature that very high intensities of pressure must be generated, calling for the establishment of a relatively large contact area of the roller against the workpiece face which corresponds to a substantial feed rate. It is out of the question to consider in practice anything but well backed-up rollers for this concept. Even if it were possible to use rollers in bearings, from pressure considerations they would become unwieldly large and render it practically impossible to have access or space to operate on the workpiece.

The predominating factor that determines the feed rate is usually the thickness of the material, which in turn determines the diameter of the roller. The total force employed on the roller depends on the stiffness or plasticity of the material as well as the thickness of the workpiece.

When the roller operates against a workpiece, say a slab of cold steel for example on a die, the principal deformation is downwards and it is usually this deformation which is sought after. But there are also other associated secondary displacements due to the large forces established.

There will be side flow, for example, when the roller is narrower than the workpiece (in which case it will be bevelled off in order to prevent side laps) in the direction of the axis of the roller and there will also be flow along the direction of movement of the roller. This side and end displacement may be contained, or it may be allowed to take place at the expense of allowing material to overflow to waste which must be trimmed off thereafter. The backed-up roller may be stroked in the direction of the workpiece, if this be non-circular, picked up and worked in another area to return such side and end flow resulting in greater utilization of material. The shape and locus of the roller will usually be determined by the workpiece in hand. The length of the roller in contact with the workpiece will determine the amount of force to be employed and hence the size and rigidity of the framework or structure. Whether there is employed planetary rollers, one roller which is nested against two back-up rollers usually the preferred type, or a surface giving rise to single line back-up, and whether the roller is moved and the die is stationary or vice versa is a matter of choice usually also determined by the workpiece in hand.

There are no such restrictions as plan area and hence total load, draught angle, minimum rib or web thickness as in comparable forging processes. There are, however, restrictions as to the shape of the workpiece contacting with the rollers which must of necessity be of simple shape and cannot have shapes that will interfere with the rolling. It is not excluded, however, that there may be grooves in the roller to enable back extrusion in the form of fins to take place on the surface of the workpiece in contact with the roller. Forward extrusion in the form of thin ribs, crossed configuration if desired, may also take place into the die face. Theoretically there may be any height of back extruded fins or any depth of rib into the die desired provided that there is sufficient material and that it is not allowed to escape sideways or endways.

This invention relates to the shaping of articles from materials which are, in the mass, highly resistant to deformation but which are nevertheless capable of plastic deformation if enough force is used; and which, when so deformed, remain so or nearly so. Materials of this kind include metals such as steel, copper and aluminium, and non-metallic materials such as aggregates of crushed stone and sand, for making concrete, and some bodies of discrete particles or granules, for instance of plastic.

The shaping may involve compaction of a body of the material into a mould, to compress it, without plastic flow, for instance the densification of concrete by vibration or tamping; or it may involve plastic flow such as occurs in forging or extrusion techniques.

However, as the invention will find its major applications in the shaping of metallic articles, it will therefore be dealt with herein with particular emphasis on the manufacture of metallic products.

Forging of machine components has obvious advantages over other processes, such as machining or casting. Machining is slow, requires skilled operators which are more and more difficult to come by, and is expensive as regards material, since there is inevitably a high proportion of waste. Casting means that moulds have to be made, furnaces provided for melting the metal, and the end product lacks the strength of machined or forged components.

Unfortunately, forging is not itself without disadvantages. Initial machine cost is high, running costs apt to be expensive, and dies are subjected to very severe conditions and must often be repaired or replaced. Cold forging limits the utility of the process greatly and hot forging, while permitting the production of many articles which cannot be forged in the cold, introduces complications and additional cost, especially where further machining is required.

The object of this invention is to propose techniques which are applicable to the production of many articles which are presently made by non-forging methods because of the limitations of forging procedures presently available and to produce new articles.

According to the invention, the method consists, broadly, in traversing the surface of the material by a procession of small rollers, each in turn brought to bear on an element of the surface to apply to the element a transient high-intensity pressure, and continuing so to transverse the area until it has been blanketed.

In so far as deformation of the area is concerned, the method consists, further according to the invention, in juxtaposing a pattern of the article to be produced to a blank; and kneading the blank into intimate contact with the pattern by rolling pressure applied progressively in a prescribed locus, and continued until the blank is brought into conformity with the pattern; and withdrawing the formed article from the pattern. It is not excluded that the blank be hot when it is pressed against the pattern, but usually the operation can and would be performed in the cold. The locus would usually be circular.

It is also not excluded that the blank be selectively heated in certain zones such as the zone adjacent the pattern.

In a development the kneading means is itself a pattern, so that it imposes the complement of its own shape on the blank; which may be in addition to the configuration kneaded into the opposite face of the blank.

It is evident that there is a fundamental difference between the process of the invention and the conventional forging process. In forging articles, the forging pressure is applied to the blank as a whole, whereas, in the technique of the invention, the pressure is steadily applied but to different elements of the blank progressively, and is continued until the product has been produced. Thus, deformation or compaction of a mass of material that is resistant to flow, is carried out to a greater degree, more effectively, and applied to a wider field than heretofore, by the application of localised high intensity pressure progressively to achieve the desired results.

Techniques of profiling the outer and inner faces of annular workpieces by rolling have been explored, at least theoretically. By these techniques, or at least by such of them as are practical, many components, such, for instance, as the outer and inner races of normal rolling bearings, can be manufactured competitively with machined races. Essentially, however, the techniques are confined to circumferential faces. The present invention enables annular components to be profiled at their sides, and, in combination with the techniques known for profiling the inner or outer faces of an annular workpiece, or proposed by this invention, it becomes possible in a single operation to profile workpieces on three or even four faces. How the techniques are combined will be considered later in this specification.

The invention will be further discussed with reference to the accompanying drawings, in which.

Figure 7:
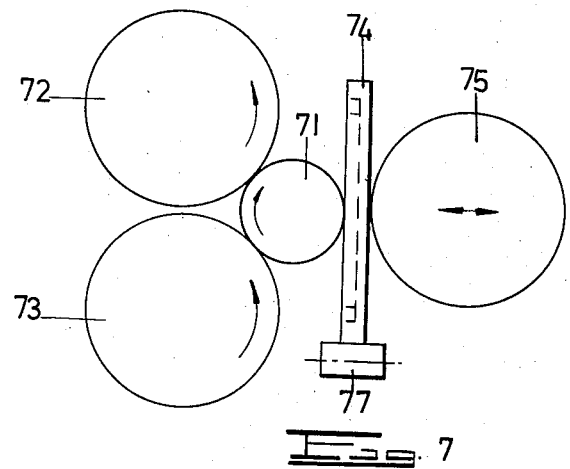
Figure 8:
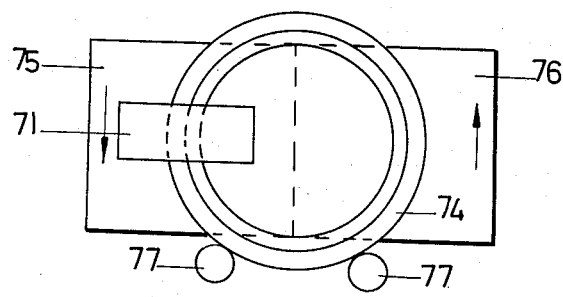
Figure 9:
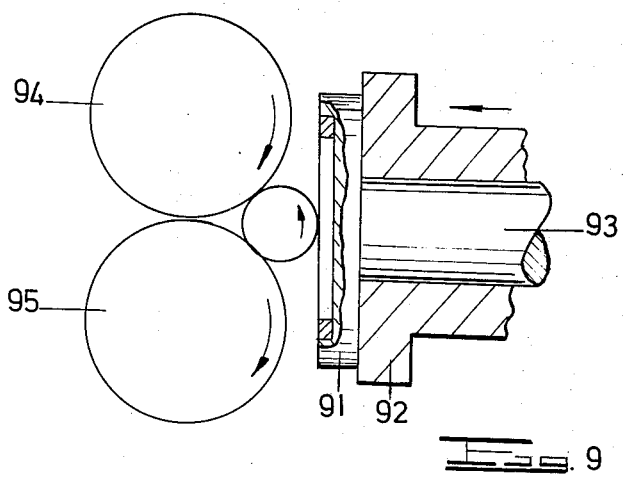
Figure 3:
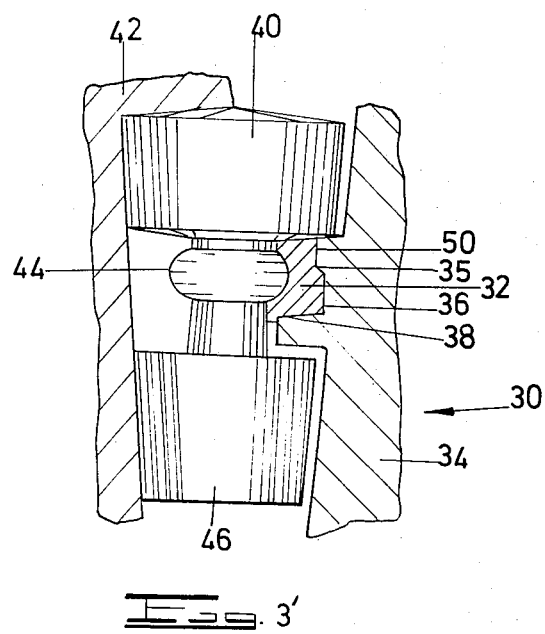
Figure 5:
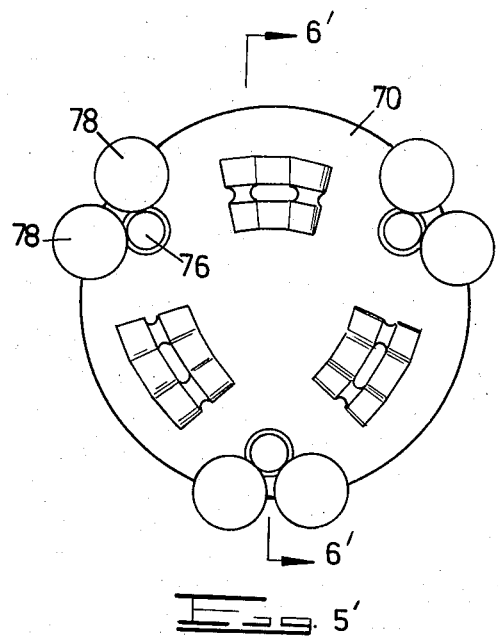
Figure 4:
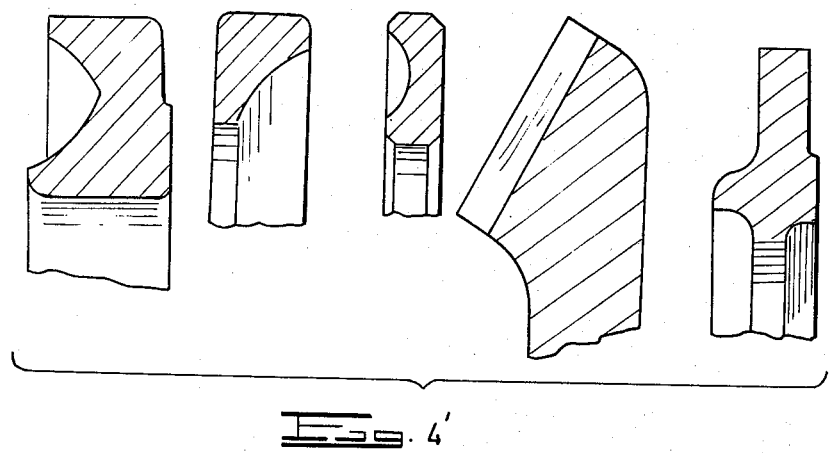
Figure 8:
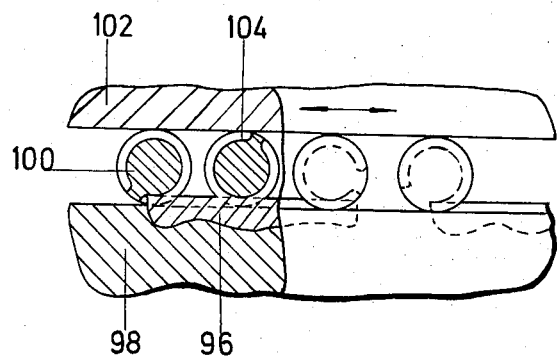
Figure 9:
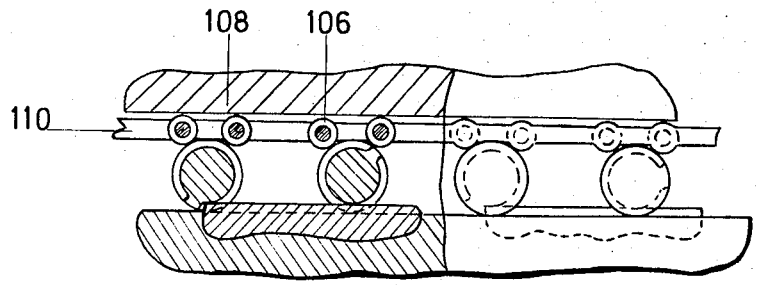
Figure 10:
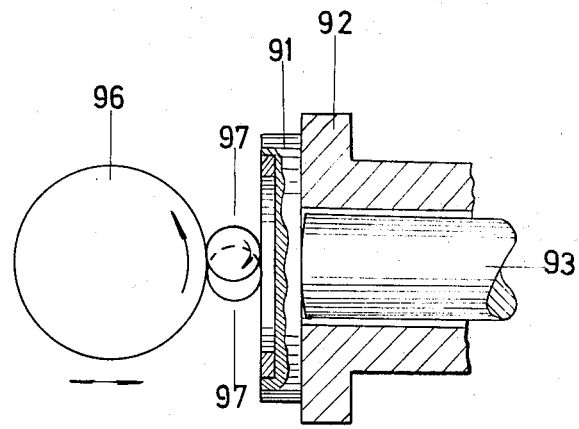
Figure 11:
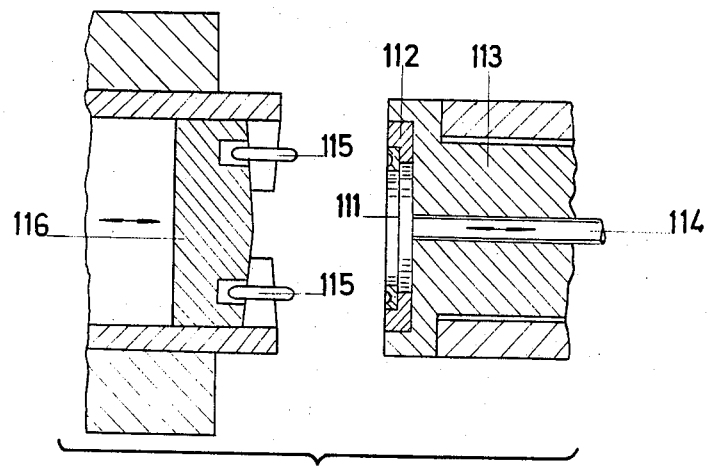

FIG. 7 is a diagrammatic side view of a modification of a machine, with the mandrel supported by two rollers, FIG. 8 is an end view of the machine of FIG. 7, employing one mandrel, FIGS. 9 and 10 are fragmentary side views, partly in section, of machines for profiling an annular workpiece, where the maximum number of formers used is two, showing double and single line contact for the formers respectively, FIG. 11 is a fragmentary side view of a machine with many formers to profile an annular workpiece, the formers being frusto-conical rollers rolling in line contact with a surface.

Figures 17, 18:
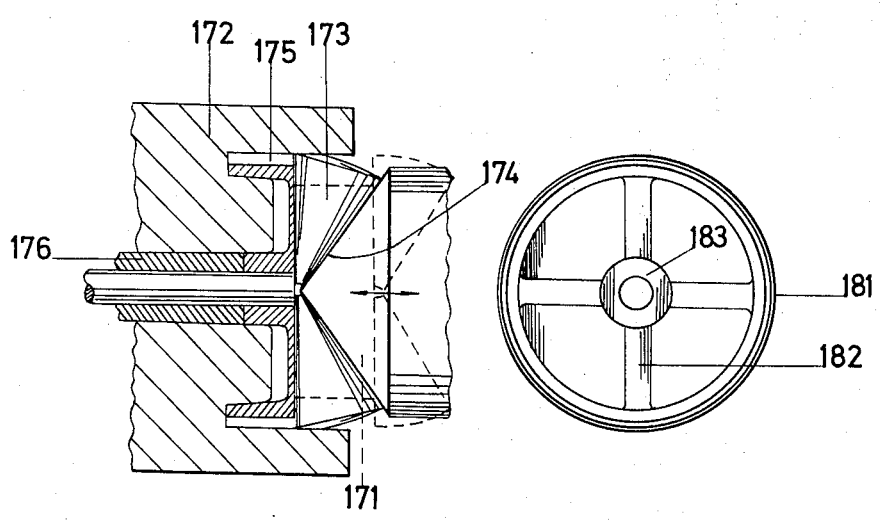
Figure 18:
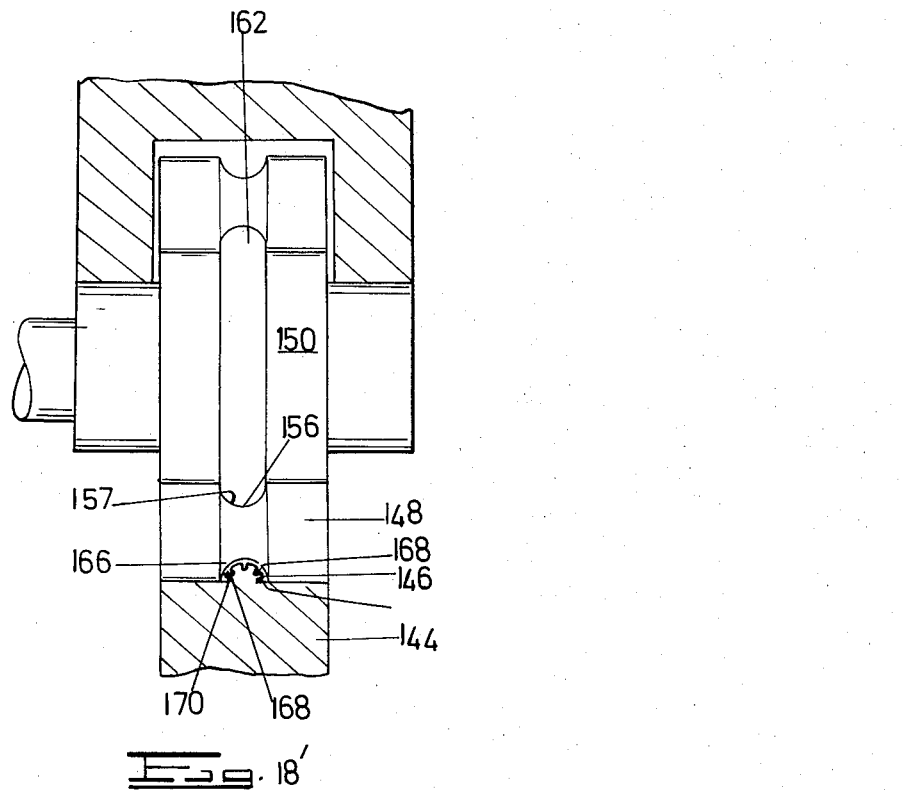
Figure 19:
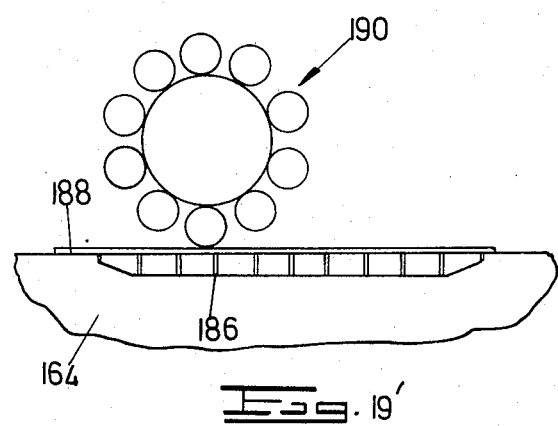
Figure 20:
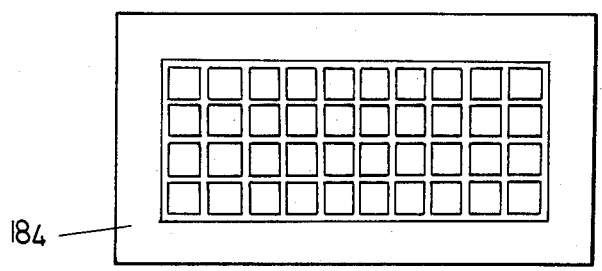
Figure 19:
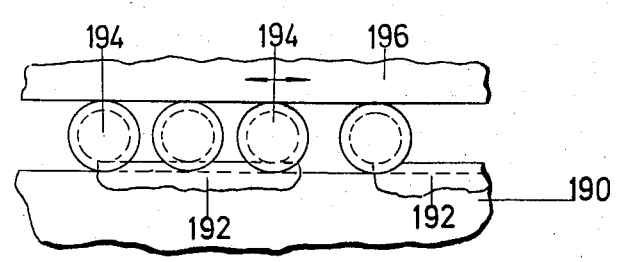
Figure 20:
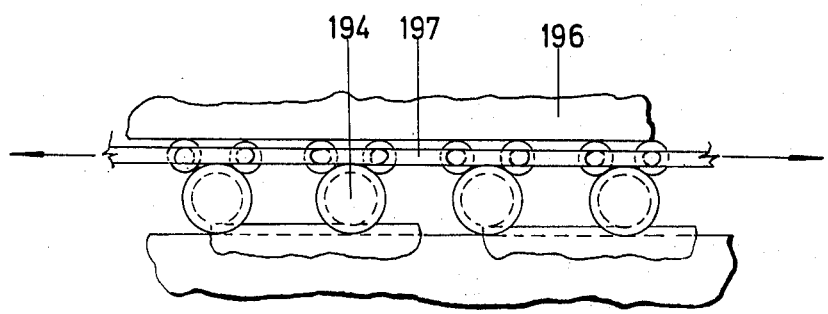
Figures 21, 22:
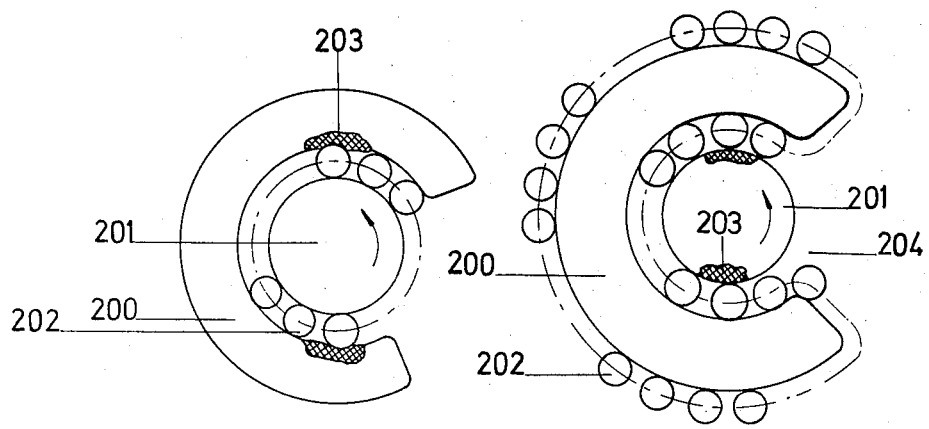
Figure 23:
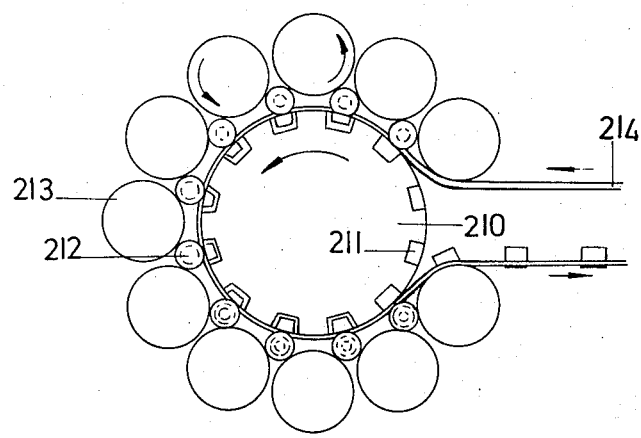
Figure 24:
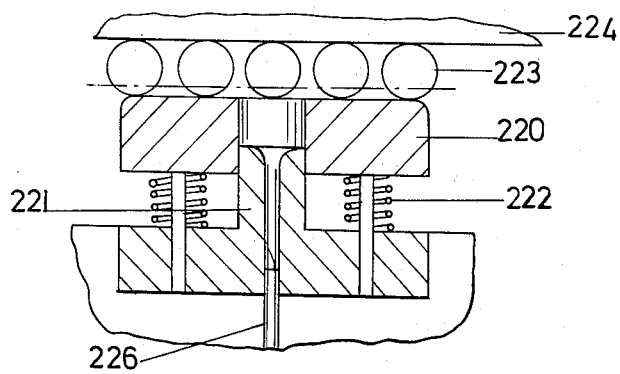
Figure 25:
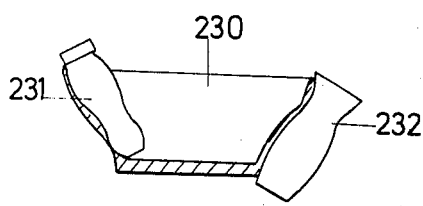
Figure 26:
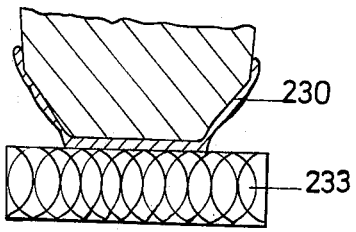
Figure 36:
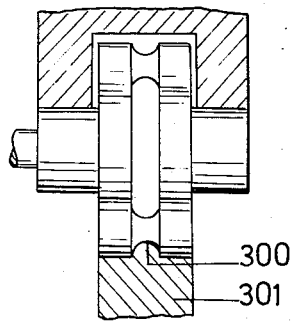
Figure 37:
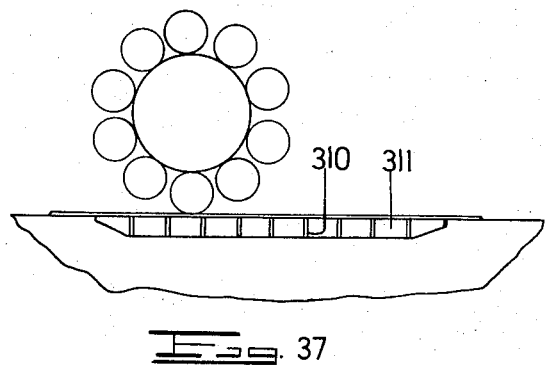
Figure 38:
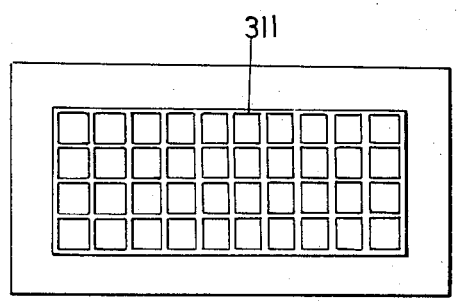
Figure 41:
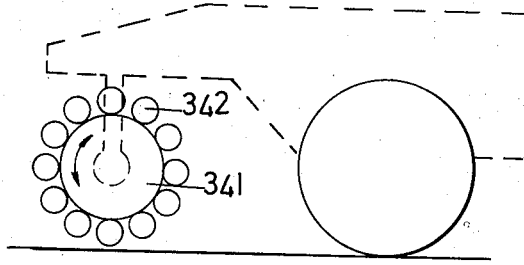
Figure 39:
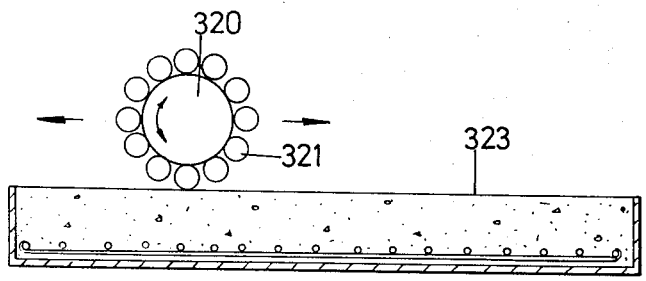
Figure 40:
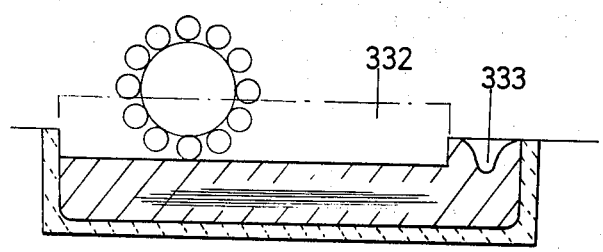
Figure 42:
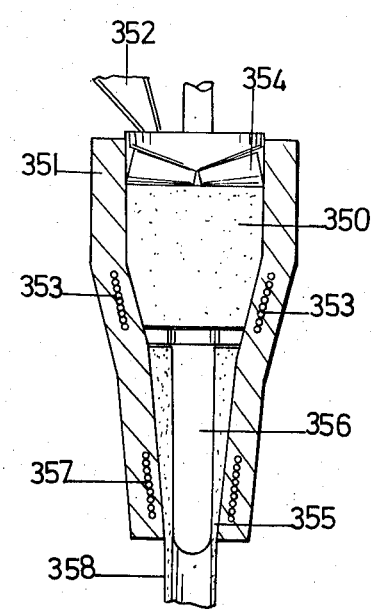
Figure 43:
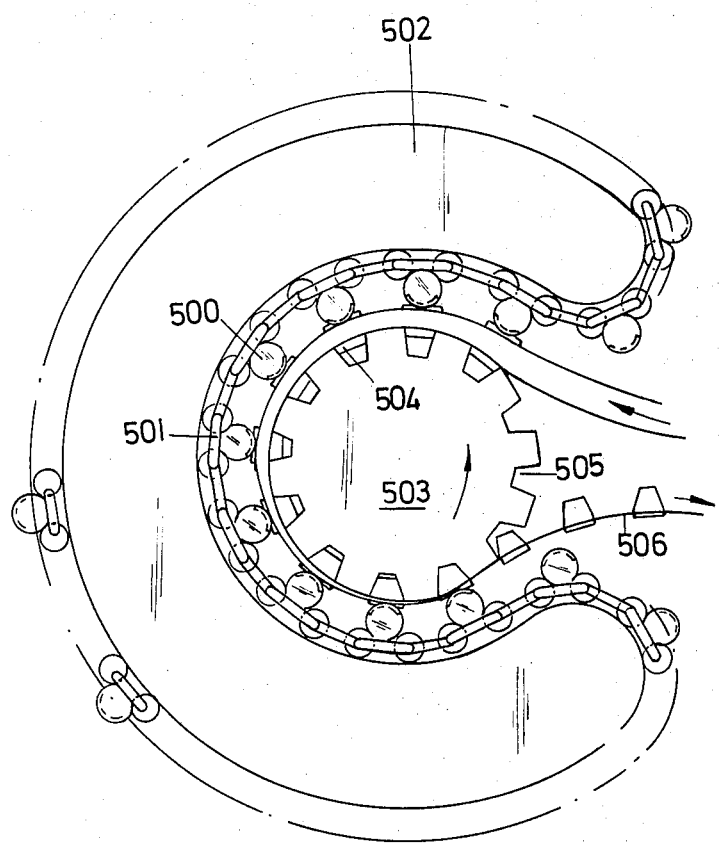

FIGS. 12 to 16 are fragmentary views, partly in section, showing arrangements where the formers are also frusto-conical rollers, FIG. 17 is a fragmentary view, partly in section, of a ribbed gear wheel, integral with a boss, rim and spokes, being made from a blank, FIG. 18 is a side view of the gear wheel produced by the machine of FIG. 17, FIG. 19 is a fragmentary diagrammatic view of an arrangement where the kneading is oscillatory, FIG. 20 is a fragmentary side view of a modification of the machine of FIG. 19, FIGS. 21 and 22 are fragmentary side views of machines employing C-frames, FIG. 23 is a side view of a machine to knead a strip to form a series of articles in a line, FIG. 24 is a fragmentary side view in section of a machine, employed to form mushroom-shaped articles, FIGS. 25, 26 and 27 are fragmentary views, in section, of arrangements to profile a dish or container, FIGS. 28 and 29 are respectively a diagrammatic end view and a side view, partly in section, of a device for kneading a workpiece into a pattern, FIGS. 30 and 31 are fragmentary diagrammatic views of a machine in which the pressure is applied to the workpiece by a series of rollers, FIG. 32 is a perspective view of an automobile bumper, as made by using the invention, FIG. 33 is a horizontal section through the bumper, FIG. 34 is a fragmentary view of the rear face of the bumper, FIG. 35 is a partial side view of a machine of the type of FIGS. 28 and 29 used to form a bumper as shown in FIG. 32, FIG. 36 is an end view of the machine of FIG. 35, FIG. 37 is a fragmentary view of a machine that is kneading a workpiece into a pattern, to form the cellular pattern of FIG. 38, FIG. 39 is a side view of a machine used to compact a particulate mass, FIG. 40 is a similar view, where the body is a partially set mass, such as a molten metal beginning to congeal, FIG. 41 shows the machine of FIGS. 28 and 29 applied to road-rolling, FIG. 42 is a sectional view of a device as used for continuous extrusion, FIG. 43 is a side view of another type of C-frame machine for continuously impressing a pattern, for example, forging, onto a plate or rod.

Figures 2, 3:
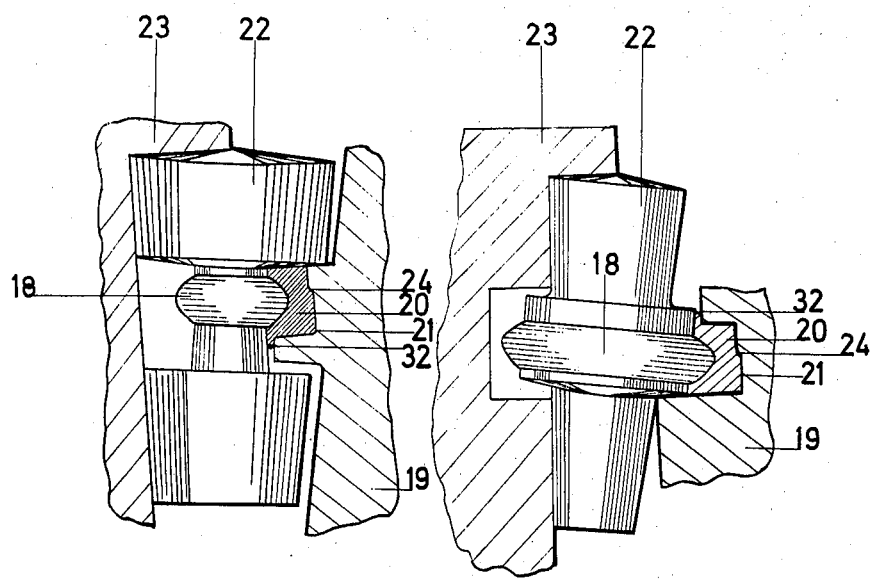
FIG. 2 is a view, mostly in section, of part of a machine to make an article illustrated in FIG. 1.
FIG. 3 is a similar view of part of a machine to make the article shown in the first position in FIG. 1.
Figure 4:
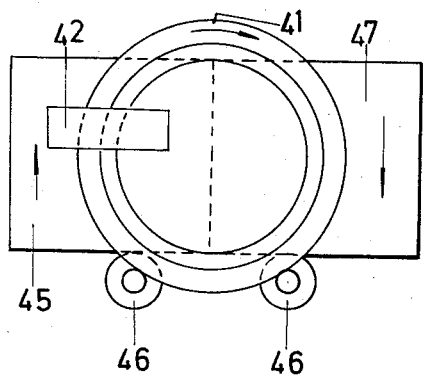
FIG. 4 is an end view of the machine of FIG. 5.
Figure 5:
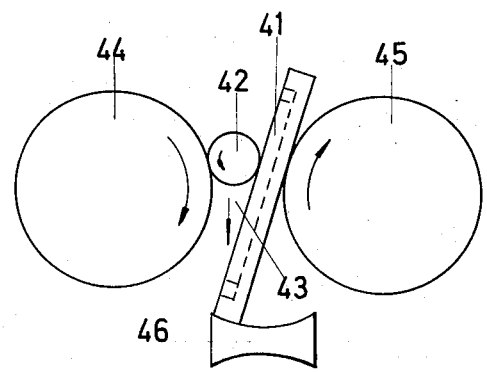
FIG. 5 is a diagrammatic side view of a machine to profile an annular workpiece on one side, at the commencement of the operation.
Figure 6:
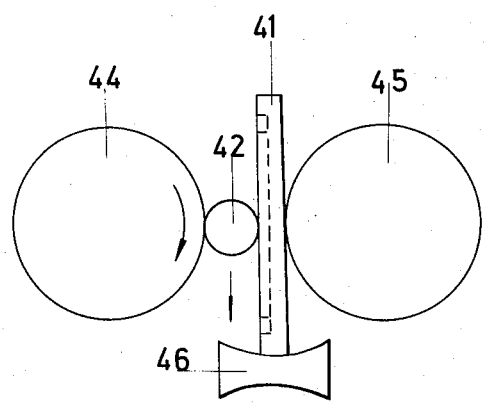
FIG. 6 is the same as FIG. 5, but with the workpiece fully profiled.
Figure 12:
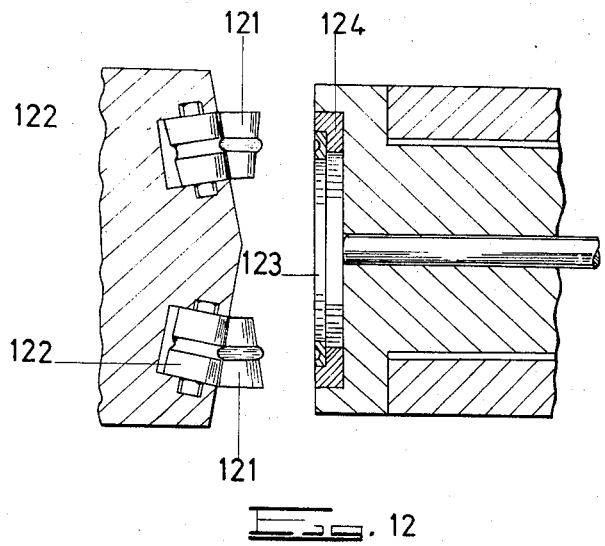
Figure 14:
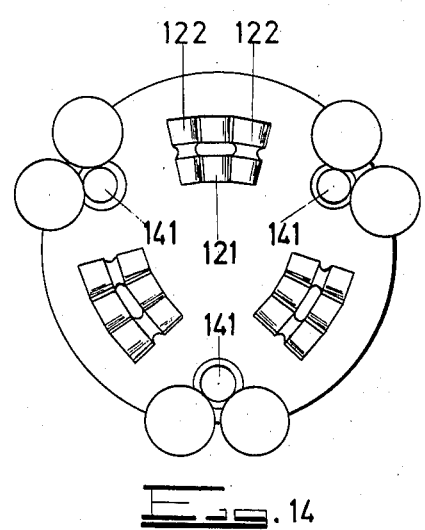
Figures 15, 16:
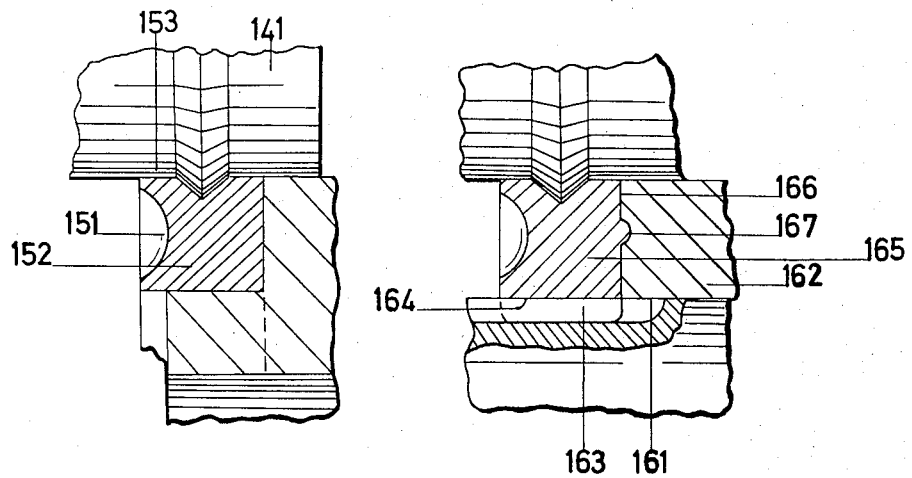
Figure 44:
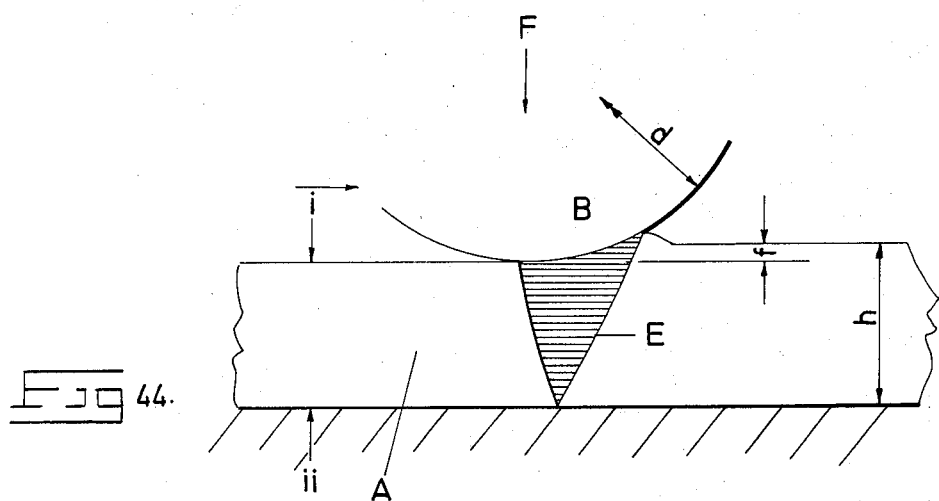
Figure 45:
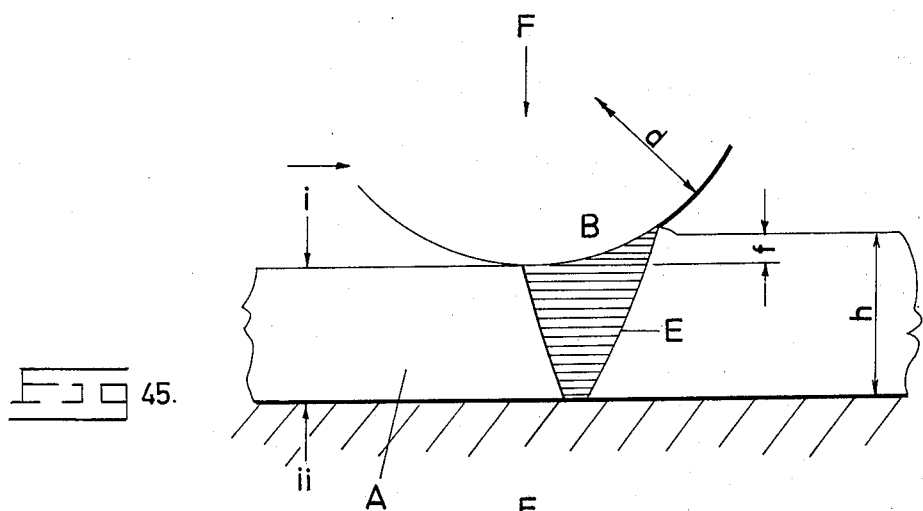
Figure 46:
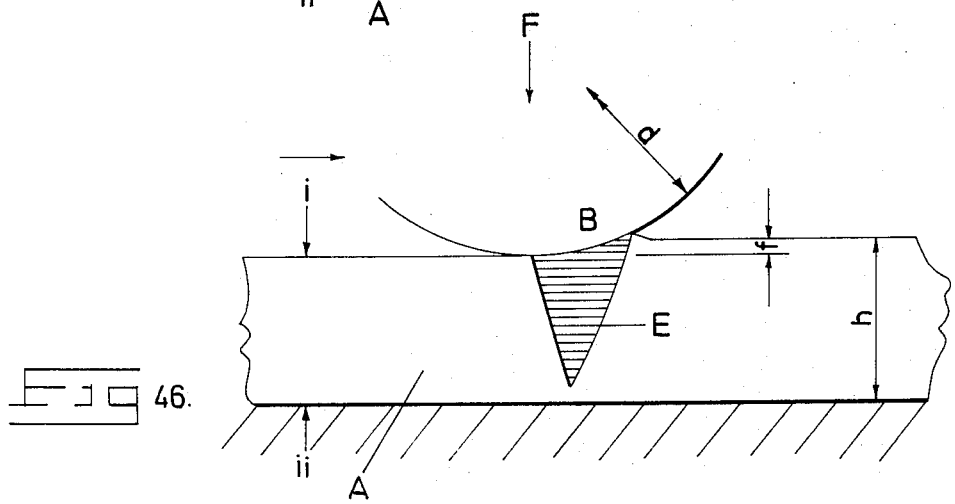
Figure 47:
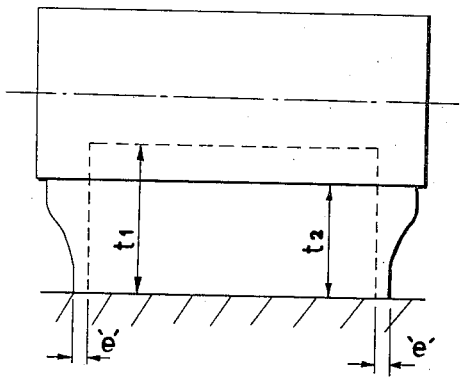
Figure 48:
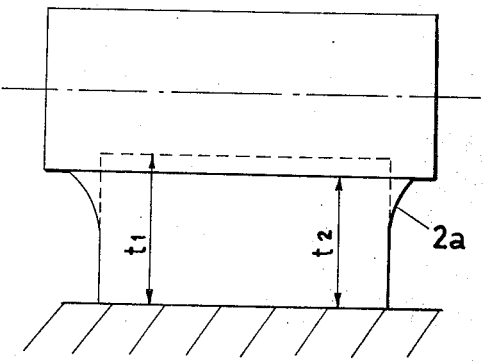
Figure 49:
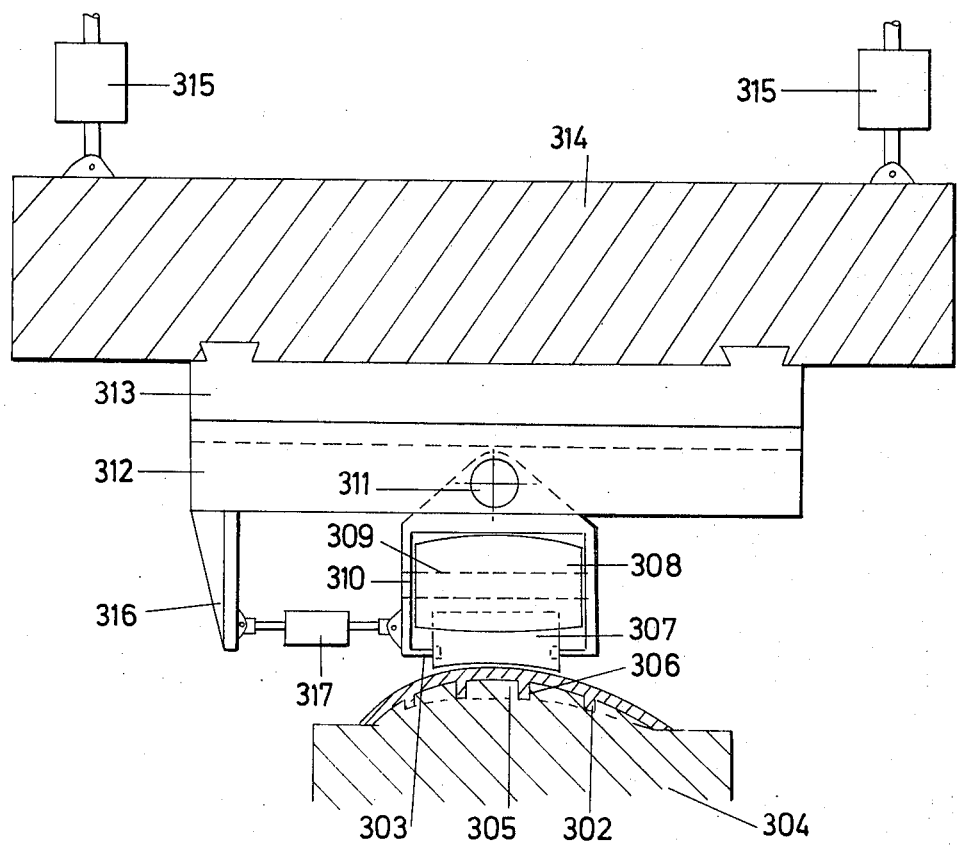
Figure 50:
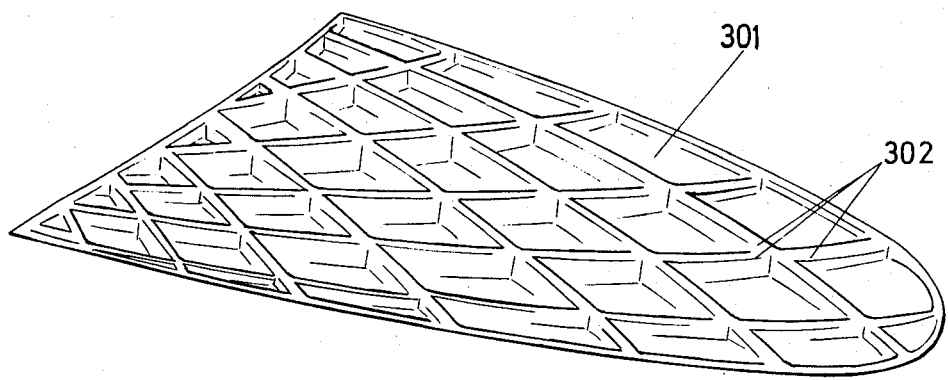
Figure 51:
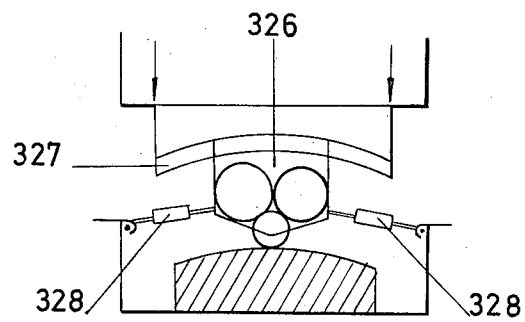
Figure 52:
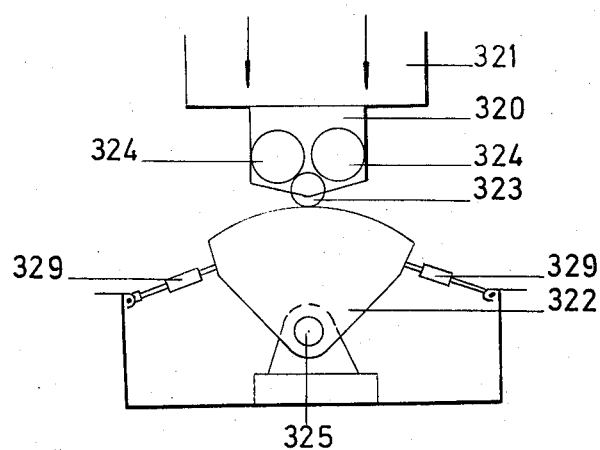

FIGS. 44–46 are diagrammatic views showing conditions at which flow of the material against the die face can be induced (FIG. 45) or not induced (FIG. 46), FIG. 44 showing the changeover point, FIGS. 47 and 48 are end views corresponding generally to FIGS. 45 and 44 respectively, FIG. 49 is a diagrammatic representation of apparatus according to the present invention for contouring a workpiece curved in three dimensions, which in the illustrated embodiment is the undersurface of an aircraft wing, FIG. 50 is a fragmentary perspective view of the underside of the workpiece contoured by the apparatus of FIG. 49, FIGS. 51 and 52 are embodiments alternative to FIG. 49, of apparatus for roving other curved articles such as window frames for aircraft fuselages, FIG. 3' is a detailed section through a part of apparatus for rolling an annular workpiece, FIG. 4' is a detailed section through part of workpieces which may be rolled by the apparatus of FIG. 3', FIG. 5' is a detailed section through modified apparatus of invention for rolling annular work-piece, FIG. 6' is a section on line 6' — 6' of FIG. 5', FIG. 7' is a view similar to FIG. 6' but showing the use of a toothed inner guide, FIG. 8' is a fragmentary diagrammatic view, partially in section, of an arrangement where the forming rollers oscillate in a straight line, FIG. 9' is a view similar to FIG. 8' of a modified arrangement, FIGS. 10' and 11' are respectively diagramatic end and side views, the former partially in section, of a device in rolling a workpiece into a pattern, FIGS. 12' and 13' are respectively fragmentary diagramatic under plan and side views of a device for applying pressure and comprising a plurality of rollers, FIG. 14' is a perspective view of a bumper made in accordance with the invention, FIG. 15' is a section through the bumper, FIG. 16' is a view in the direction of arrow 16' in FIG. 15', FIG. 17' is a detail side view machine used for a bumper shown in FIG. 14', FIG. 18' is a section on line 18—18 on FIG. 16' with the scale of the parts distorted so that the various parts may be shown more clearly, FIG. 19' is a fragmentary view of a machine for forming a workpiece into a pattern, and FIG. 20' is an under-plan view of a workpiece formed by the apparatus of FIG. 19'.

Figure 1:
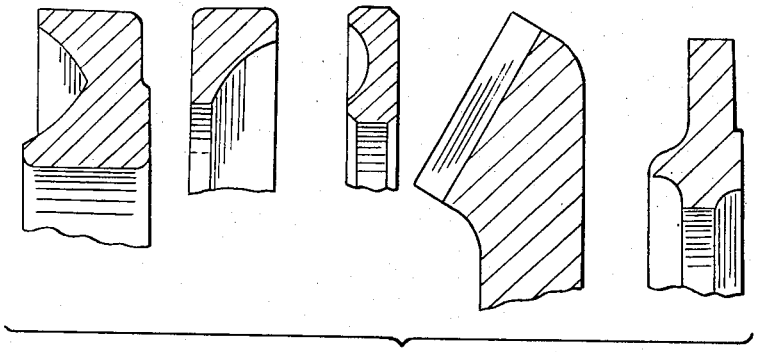
FIG. 1 shows, in fragmentary sectional view, a number of commercial articles suitable to be made by the techniques of the invention.

Consider first the several shapes shown in FIG. 1. These are all cross-sectional shapes of annuli which have plain inner and outer faces and which have one or more of their sides profiled. The shapes are, from left to right, three particular configurations of races for thrust bearings; a bevel gear, and a pipe flange. In present practice, these shapes would be produced by forging and machining. The last two could be cast. All are readily capable of being produced by the technique of the invention to exact tolerances and without waste.

In FIGS. 2 and 3, the workpiece 20, which will be recognised as that shown on the extreme left in FIG. 1, is annular and is housed in a holder 19 which confines it in its thickness dimension, between a surface 21 and a rotating former 22 that is profiled at 18. The former is backed by an annular backing member 23. The former may be free in the sense that it is not confined in bearings, but rolls upon the surface of the member 23, and there may be several formers held in a cage. On the other hand the former may be held in bearings. In the usual form, the holder 19 is cylindrical and the member is annular, and they are rotatable relatively to each other, and about the same axis, so that the former is rolled around the periphery of the workpiece and kneads its contour 18 into the outer surface of the workpiece. If the surface 21 is profiled, as it is at 24 in the drawings, its profile will be kneaded into the workpiece simultaneously with the kneading of the former profiled on both sides to produce the first configuration of FIG. 1.

It will be observed that, as the profiles are kneaded into the blanks by the former, the blank is confined on all sides, by the former and by the surface 21, so that, when the former has progressed around the whole periphery of the workpiece, the end product will be a precision article requiring at the most light machining to remove flashes 32 which are formed where the former and the surface 21 meet.

It may be that the profiling operation will be completed when the former has made one complete circuit of the workpiece. On the other hand, the kneading may be continued over several circuits. Thus, if the material being kneaded is somewhat refractory, or the shape to be imposed is especially intricate, the kneading can be continued as long as may be necessary. As the translation of former and workpiece is usually rotational, the only commodity expended in multiple circuits is time. The word "usually" is used because it is not exluded that the translation may be rectilinear or even curvilinear instead of circular. The former could in any of many ways traverse the workpiece relatively, in an oscillatory path, to and fro until the workpiece has been profiled. It is, of course, the case that the former may be stationary and the workpiece move.

It should be noted that the profile imposed on the workpiece is not necessarily a smooth one. Thus, if a surface in contact with the blank, be it the former surface or the surface against which the blank is pressed, be toothed, the resulting article will be a gear wheel, with internal or external teeth, as the case may be. If the teeth are external, some mechanism is necessary to time the transits of the former, so that the last tooth rolled will merge properly into the first tooth. On the other hand, for internal teeth, the timing is automatic in that the last tooth to be rolled must necessarily merge into the first because it is so in the pattern.

Several developments of the invention are shown in the drawings, all characterised by the face that the profile is kneaded into the workpiece progressively. In FIGS. 4, 5 and 6 the workpiece is kneaded into a floating member 41 by a former 42 that is drawn through a converging throat 43 between the member and a roller 44. The member is backed by two rollers 45 and 47. The member is itself rotating. As the former 42 is drawn through the throat by rotation of the roller 44, the member 41 is tilted, as can be seen in FIG. 6. The tilting movement of the member is controlled by two or more curved rollers 46 which also act as driving rollers for the member.

It will be seen that the former 42 will perform its kneading function only while it is traversing the throat, so that either the geometry of the machine must be such that the workpiece being pressed into the member 41 makes at least a complete circuit in that time, or there must be several mandrels following each other up through the throat.

The rollers 45, 57 are of course rotatable in different directions to allow member 41 which is in contact with both to rotate.

A variant of the embodiment just described is shown in FIGS. 7 and 8 in which the former 71 rotates about a fixed axis, as it is confined between two rollers 72, 73 and the member 74. Kneading is achieved, as the rollers 72, 73 rotate the former, by relatively moving the member and rollers together, as by pressure on two rollers 75 and 76 that back the member. In this case, there is no tilting of the member 74, which is driven by plain rollers 77.

It will be understood that, although in the drawings only one former 42 or 71 is shown, there can in fact be two, spaced diametrally apart.

In the embodiment of FIGS. 9 and 10, the member 91 is held in or is part of a backing 92. The backing or the member is rotated by a shaft 93. Again, two formers are the maximum that can be used.

In FIG. 9, the former or each former rotates about a fixed axis and is backed by two rollers 94, 95 for the or each former. The backing is forced towards the former or formers as the member 91 rotates, to knead the workpiece. In FIG. 10, a roller 96 or a pair of rollers if there are two formers, defines a throat 97 with the member 91 through which the or each former passes. It will be observed that the throats for each former converge in opposite directions to each other.

In FIG. 11, a workpiece 111, to be kneaded into the member 112 held in a backing member 113 is kneaded by a series of formers 115 held in a holder 116 which is urged towards the workpiece 111. The formers are arranged in a circle, so that each follows up its predecessor in the same locus.

The workpiece may be rotated or may be stationary.

A pusher 114 may be provided to extract the workpiece from the member 112.

Figure 13:
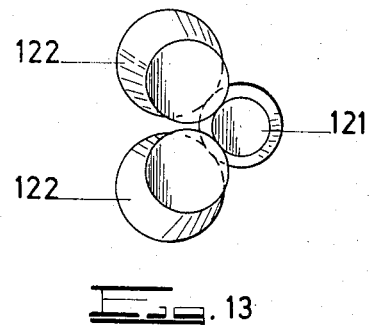

FIGS. 12 and 13 show an arrangement akin to that of FIG. 11, except that the formers 121 do not roll on the holder, but each rolls on a pair of rollers 122 (see FIG. 13) which are frusto-conical. The formers are themselves frusto-conical so that they are lined up with the workpiece 123 held in the member 124.

In FIG. 14 formers 141 are added to the arrangement of FIGS. 12 and 13 to profile the outer circumferential face of the workpiece. This is seen happening in FIG. 15, where the face 151 of the workpiece 152 is profiled by the formers 121 and the circumferential face 153 by the formers 141. A logical extension is shown in FIG. 16, in which the face 161 of the member 162 is profiled, as with gear teeth 163, to impose its form on the inner face 164 of the workpiece 165. Since the face 166 of the member 162 can also be profiled, as shown at 167, the workpiece can be profiled on all four faces, simultaneously. The formers 141 impress their shape by virtue of the indirect displacement of the metal from face 151.

They may, however, be moved independently inwardly to cooperate simultaneously with the other formers. If the profile they impose is re-entrant they must, however, be displaced to allow ejection of the component. Any of the formers may be carried in bearings and not necessarily roll in line contact with a face nor with other back-up rollers.

In FIG. 17, a component such as the wheel shown in FIG. 18, with a toothed rim 181 and spokes 182 radiating from a hub 183, may be kneaded, integral with a web joining them all. A rough annular or solid blank 171 shown dotted in FIG. 17, is kneaded into the cavity of a die 172 by a series of formers 173 that are rotated in contact with a rotating nose 174 of conical shape complemental to the taper of the formers. The cavity of the die has teeth forms 175 in its peripheral surface which are impressed upon the blank 171 as it is forced into the die cavity by advance of the nose 174. A pusher 176 ejects the finished article and also acts as a stop during the formation of the boss.

It has already been observed that the profile need not necessarily be a smooth one. Take FIG. 19, for instance. Here, the pattern 190 is planar and the workpieces 192 are kneaded into the pattern by means of one or more cylindrical formers 194, that are rolled back and forth by means such as an oscillating plate 196, which is pressed against the formers to kenad them into the workpieces. The formers must, of course, be identical, so that each follows up the impression made by its predecessor, as the plate oscillates; and the amplitude of oscillation must be sufficient to ensure that the full pattern is imposed on the workpiece. The formers and the pattern 190 may be held in synchronism by means such as a rack on the pattern and pinions on the formers; and the pinion may also be engaged by a rack on the plate 196 to avoid slippage.

The workpieces may be slugs or blanks placed one each within each pattern, as is shown in FIG. 19; but the workpieces may, on the other hand, be flat bars or plates that are kneaded by the formers to impose the pattern on them. Multiple articles may be formed, joined by rupturable webs.

Of course, as in conventional forging techniques, provision must be made for ejection of the formed article from the pattern, and the article must be demouldable.

In a development of the embodiment of FIG. 19, applicable to small articles, or to articles kneaded from especially malleable material, there may not be the need for forcing the formers into kneading contact with the workpieces: it may suffice to roll the formers over the blanks to knead them into the pattern. The return motion of the formers may be idle. The formers may be in a group, of progressively increasing depth.

In another embodiment, shown in FIG. 20, the to-and-from motion of FIG. 19 is dispensed with and a heavy power-driven roller chain 197 is interposed under the plate 196 to obtain the re-circulating or reciprocating motion of the formers 194.

The path of the formers may be curvilinear. For instance, in FIGS. 21 and 22, a C-shaped body 200 has within its cavity a driven roller 201 that is the equivalent of the plate 196 of FIGS. 19 and 20. The formers 202 are passed through the arcuate gap between the body and the roller by rotation of the roller. Patterns 203 are provided either in the wall of the body 200 or in the periphery of the roller 201. Blanks are introduced into the patterns and are kneaded into them by the formers. In FIG. 21 there are diametrally opposed patterns and a corresponding number of groups of formers; so that the system is in balance. The patterns are in the body and the roller is stopped intermittently to withdraw the formed articles. In FIG. 22, the patterns are in the roller, and the formed articles are withdrawn as they move through the gap 204 in the body.

A development shown in FIG. 23 provides a driven roller 210 with a series of patterns 211 in its surface, and a series of formers 212, which may be profiled, rotating freely about fixed axes and held in position by one or more series of back-up rollers 213, that are rotatable about fixed axes. A strip 214 is fed between the formers and the roller. The roller 210 and/or 213 is or are driven. The strip has the patterns of the roller, and of the formers if such there be, kneaded into it during its passage through the machine. The strip emerges from the machine as a series of finished articles joined by webs. The strip may be drawn through the machine by external means.

In another development, the formers and roller are smooth and the gap through which the strip is drawn narrows, so that the finished product is a rolled strip which is of high finish and precise thickness. The machine is attractive as an alternative to the conventional strip-rolling mill by reason of its simplicity and compactness, and because of the balance of forces generated by the kneading of the strip to thin it.

In a development of the embodiment described in the last preceding paragraph, the formers 500 (FIG. 43) are driven by a chain 501 which is guided and supported by the frame 502. The chain is itself driven in any suitable fashion. The throat between the frame and the roller 503 narrows, so that the formers, as they progress through the throat, are able to bring progressively more pressure to bear on the workpieces 504 that they knead into the patterns 505. The movement of the chain is synchronised with that of the roller.

This embodiment produces a series of finished articles joined by webs, as is seen at 506. The throughput can be very high and the feed rate is capable of infinite adjustment from zero.

In the embodiment of FIG. 24, the pattern is contained within a block 220 which is slidable on a boss 221 against the resistance of springs 222. The upper surface of the boss defines the base of the pattern, and the pattern may extend into the depth of the boss, as shown. Formers 223 are driven through a gap between the block 220 and a plate 224. A blank 227 is inserted into the pattern and the plate 224 is pressed towards the block 220 for the formers to knead the blank into the pattern; the springs 222 giving, to allow this to happen. The resulting article, such as the mushroom valve 225, is ejected by a pusher 226.

Yet another aspect of the invention renders it possible to make use of metals efficiently with special regard to their properties. As an example a stainless steel dish 230 (FIG. 25) or pot has its contours selectively reduced, as shown, by formers 231 and 232 bearing respectively within or without, the surfaces. Thereafter or while still on the same pattern, a former 233 (FIG. 26) may be brought to bear upon the base to impose a pattern on it. Subsequently, the base may be thickened by using smooth rolls and kneading a disc 234 (FIG. 27) of a highly malleable material such as copper or aluminium on to the base, to key with formations 235 formed on the base.

It is apparent that the scope of the invention is vast. It cuts down the number of components, the quantity of material used, handling charges, assembly costs, fabrication and plant for most manufactures used today. It makes possible the production as units of such items such as the major portion of aeroplane wings, complete panels for railway trucks, the various sheet and plate steel components as used in automobiles, in one integral piece. It can provide for the inclusion of lugs, bosses, stiffeners, reinforcers, selective thickening or thinning of metal, inclusion and bonding of diffrent metals or materials; processes that would require pressloads of humdreds of thousands of tons to be produced by conventional methods. It is doubtful whether dies or presses would be able to stand up to the task, but the kneading process embraced by the invention makes possible the production of such items with the application of relatively low forces.

In FIGS. 28 and 29, a power-driven roller 240, driven by a shaft 241, is surrounded by planetary rollers 242, that as they rotate apply, each of the, a high-intensity transient pressure on a workpiece 243 on a pattern 244 (FIGS. 28 and 29). The ends 245 of the shaft roll upon a surface 246, through a bearing sleeve 247.

In FIGS. 30 and 31, hardened steel rollers or balls 260 are contained within a recess in a rotating holder 261 and knead a substantially flat workpiece 262 into whatever pattern is provided in a base 263.

To illustrate the utility of the technique of the invention, an automobile bumper, FIGS. 32 to 34, of general C-shape, requires less than half the amount of metal to achieve its purpose if produced by the methods of the invention. It is strengthened by ribs 290, 291 and 292, (FIGS. 33 and 34). The recesses 293 merely serve an aesthetic purpose, in that the floors provide the continuous outer face 294 of the bumper. Moreover the need for polishing is removed as a burnishing effect is produced, and because of its light weight the economic use of stainless steel is practicable. The machine of FIGS. 28 and 29 may be used to follow a curvilinear path corresponding to the shape of the component, as shown in FIG. 35. The workpiece 300 is placed on a pattern 301, the re-entrant portion 302 being sprung off for withdrawal from the pattern 301.

It would not be possible to produce the cellular panel of FIGS. 37 and 38 with its selectively placed ribs 310, 311 by a rolling mill whose products are necessarily of uniform cross-section, yet by the use of the techniques of the invention it could be "tailor-made" to meet exact requirements such as the inclusion of lugs, the folding over, around and under, of the outside rim for stiffening purposes, and the inclusion of a plastic material kneaded into the recess 312 in the back face of the panel, such as is required for noise and heat insulation purposes, or even the further kneading in of different metals or material for other purposes.

Machines operating on the principle of that illustrated in FIG. 28 and FIG. 29 can find application in the compaction of bodies such as moulded metals or concrete. In FIG. 39, such a machine, with a rotating roller 320 having planetary formers 321 arranged around it bears down on a body of concrete 323 in a green state. The machine is pressed down on to the concrete body and is moved to and fro across the body.

The roller 320 may be rotated at any speed relatively to the rate of translation of the machine. The formers, as they make contact with the body 323, knead or pummel it progressively along its surface. The result is that the force applied to the body over a small area generates very high pressures, although the force is itself not of great magnitude and if applied over all but a small surface area of the body would produce no significant effect. The progressive production of the high pressures along the surface causes high compaction of the body and densifies it to better effect than is possible by vibration or tamping.

The body may, of course, be of cast metal, as in FIG. 40, which is still partially molten but has a solidified skin, which has been preformed by chill-block 332, of sufficient thickness to sustain the hammering of the formers which eliminates the pipe formation 333 and allows the impurities to exude.

Another application is seen in FIG. 41, where the body 340 is a road. The machine 341 traverses the road and the formers 342 apply localised high pressure to it to compact it. It is to be noted that the speed and direction of the planetary rollers are independent of the speed of the vehicle. When it is required to traverse very soft terrain, the planetary rollers may, for instance, be locked to the back-up roller.

In FIG. 42, a mass of discrete particles 350 is introduced into a pestle 351, through a feeder 352. The mass is heated as by induction coils 353 and pressure is applied to the surface of the mass progressively by a device 354 such as that of FIG. 17. The material is extruded through an annular orifice 355 between the tapering wall of the pestle and a central core 356, to form a continuous pipe 358. Cooling fluid is circulated around the orifice through coils 357. Without the core, it would be extruded as a bar or wire.

Finally, a few words may be said about the nature of the materials which are treated by the techniques of the invention. The techniques apply to most materials other than refractories which tend to crack under pressure. The particular material to be used must be selected for its characteristics.

Different materials differ in their ability to retain the shape imposed on them. (For example soft rubber has no retaining property at all.) Steel in a hot state is very ductile whereas in the cold state it has slight elasticity which allows for a small springback after compacting. Aggregates or mixtures of other materials also have different properties, for example sharp needle-like crushed rock is more capable of retaining a degree of compaction than, say, smooth circular pellets or smooth metallic balls. Alloys of metals have greater resistance to deformation than pure metals, because once slippage begins between the crystals or grains they tend to lock more tightly and resist flow more than pure metals. The invention is well capable of dealing with such materials because of the application of high pressures over small areas, where conventional forging or extruding techniques, especially in the cold, would be impossible.

Practical considerations from the point of view of depth of groove permissible to be cut into the roller and the depth of ribs to allow easy demounting of the workpiece from the die do, however, introduce practical restrictions.

To illustrate this invention reference is made to FIGS. 45 and 46 of the accompanying drawings which are diagrammatic views showing respectively conditions at which such flow of the material against the die face can be induced and not. FIG. 44 shows the change over point. In practice FIG. 45 will be used.

FIGS. 44, 45 AND 46.

In these Figures there is shown a workpiece A having a thickness $h$ and width $w$ being rolled on one surface $i$ by a roller B having a diameter $d$ under force F and moving in the direction of arrow $c$. The feed of the roller is $f$. The roller must be backed up for the reasons set out above and the axial length of the back-up $l$ is greater than the width $w$ of the workpiece.

Below the roller B there is, I have appreciated, a portion which is generally triangular in section indicated by E wherein the pressure $p$ is sufficient to induce plastic flow. If the sides of the triangle intersect within the thickness of the workpiece as shown in FIG. 46, it will be appreciated that the pressure at the side ii of the workpiece A will be less than that sufficient of induce plastic flow at that side. If, however, the sides of the triangle intersect beyond the side ii of the workpiece A as shown in FIG. 45, the pressure at the side ii within the triangle will be sufficient to induce plastic flow against the die face. When the sides of the triangle intersect on side ii, as shown in FIG. 44 this constitutes the critical change-over point.

Some typical Figures for the various parameters mentioned above for cold mild steel workpieces to provide a triangle of the kind shown in FIG. 44 i.e. just sufficient to induce such plastic flow against the die face are as follows:

| | | | | | | | |
|---|---|---|---|---|---|---|---|
| $h$ | ½" | ¼" | 1/16" | 1" | ½" | ¾" | ⅛" |
| $w$ | 2" | 2" | 2" | 2" | 1" | 1" | 1" |
| $l$ | 8" | 8" | 8" | 8" | 2" | 2" | 2" |
| $f$ | 1/32" | .010" | .001" | .1" | 1/16" | 1/32" | .008" |
| $d$ | 8" | 8" | 8" | 8" | 2" | 2" | 2" |
| F In tons | 80 | 45 | 13 | 140 | 27 | 21 | 12 |

It will be apreciated that the figures above give the minimum feeds and loads and if it is desired the feed rate and indeed the load can be increased somewhat to give a triangle more like that shown in FIG. 45.

I have also found that where the side ii of the workpiece is induced to flow into a recess in the die, which recess (hereinafter is called an "open recess") is open at the ends in the direction of the arrow c this material will be prevented from flowing in the direction of the axis of the roller B, a somewhat greater pressure under the roller will be required.

When the recess is closed on all sides (hereinafter called a "wholly enclose recess") the material which is induced to flow into the recess cannot flow in any direction other than downwardly after it has butted against the sides of the cavity at each level. A still greater pressure is required. It will be appreciated that this is so because of friction between the material and the sides of the recess.

This is particularly so when the width of the recess or die cavity is small in relation to its thickness e.g. when a fin or the like is being formed in the die.

A number of arrangements are now shown, in which arrangement the total load and hence the feed, the diameter of the roller and workpiece thickness is in the required relationship so that flow of the workpiece at its side ii against the die face may be induced.

The FIGS. 47 and 48 are end views corresponding generally to FIGS. 45 and 44 respectively and show plastic flow being induced against the die face and wherein such flow takes place respectively. It will be noted that where the feed rate, and hence pressure against die face is sufficient, that this is associated with a spread of the workpiece by 2e against the die face.

This must not be mistaken for the superficial spread as in FIG. 48, which if continued long enough will eventually predominated and may also cause the face of the workpiece against the die to spread but without such pressure to import clear and fine definition to the workpiece necessitating further machining.

FIGS. 49 AND 50

In these figures there is shown the undersurface of a wing 301 which is curved in three dimensions, which converges towards a smaller end and which is provided with a honeycomb of ribs 302 on its under surface.

The wing 301 is formed on a die 304 which has a portion 305 standing proud to correspond to the undersurface of the wing 301 and having die impressions or recesses 306. The material of the workpiece is forced into these recesses 306 to form the ribs 302.

A forming roller 307 is backed up by a pair of rollers 308 which are rotatable on shafts 309 respectively carried by a block 310. The block 310 is carried by a robust pivot 311 on a transversely slidable slider 312 carried in a second slider 313 that is longitudinally slidable on a robust back-up member 314 movable towards the die 304 by means of jacks 315 or any other suitable means. An arm 316 projects from the lower slider 312 and a double acting jack 317 is provided to vary the inclination of the block 310 to accomodate the curvature of the wing.

The forming roller 307 is concave and is of such concavity that it corresponds to the curvature of the wing of maximum radius. The back-up rollers 308 support the roller 307 over its entire length and are convex to fit the curvature of roller 307. A cage 303 or similar light means is provided to hold the roller 307 in position but does not convey any pressure to the roller 307, this being done by the back-up rollers 308.

Suitable jacks (not shown) which are controlled by computor or similar numerical controls move the sliders 312 and 313 to conform with the shape of the wing. The control also controls the inclination of the block 310 through the jack 317.

Shapes similar to wings, e.g. ships propellors, bulkheads for aircraft, which may or may not be finned can be made in the same way. The shapes may be either convex or concave and it will be understood that a correspondingly complementary shaped roller and back-up will be used. More than one roller may be employed at a time and they may be manipulated to gather some material towards any desired point or area.

FIGS. 51 AND 52

In these figures there is shown apparatus for rolling other curved articles such as window frames for aircraft fuselages. In FIG. 52 there is shown a block 320 which is fixed to a travelling slide 321 and which is similar to the block 310 with rollers 323 and 324 similar to the rollers 307 and 308. The die 322 is carried on a substantial pivot 325 and is caused to oscillate by means of jacks 329 so that the forming roller 323 can act on the workpiece.

In FIG. 51 the block 326 is movable over a travelling curved slide 327 by means of jacks 328.

GENERAL

It has been found that material flows more readily in the direction of the movement of the roller than along its axis, especially when the material is relatively thin. End walls and side walls in the die, particularly at the periphery of the desired shape are effective to restrict such end and side flow. They also increase the thickness that can be rolled for a given feed rate at the expense of increasing the total load that is required.

The "degree of entrapment" creates a state of compression in the material whereby it is now possible to roll to finished size materials such as $Ti_6Al_4Va$, maraging steels and super alloys as used in the "hot ends" for jet engines, even in the cold.

The invention is equally applicable to powder metallurgy, cerment and composites. The pressure may be applied before, after or during sintering powder or powders — fibre or other composites.

When used to apply a powder or fibre coating on to a body the feed rate and hence pressure, it will be understood, will be sufficient to induce such flow against the face of the body as if it were a die.

As mentioned above, in all the embodiments hereinbefore described the relationship of the load, and feed it to the thickness and constitution of the article. Further, various profiled or non-profiled forming rollers may be used, depending on the shape of the articles being rolled. The rolling will normally take place in the cold but very tough metals, such as maraging steels, nickel and titanium alloys, may be rolled warm or hot. The workpiece will, as soon as rolling commences remain stationary on the die.

The various backing arrangements can be used interchangably.

FIG. 3'

FIG. 3' shows the apparatus 30 for rolling cold annular mild steel workpiece 32. The apparatus 30 comprises a die 34 which has upper or working surface 35 with an annular recess 36 in which the workpiece 32 is received when rolling is complete. The recess 36 has an inner side wall 38 which restrains the metal of the workpiece 32 flowing in a direction radially inward of the annular recess and as the recess is annular the metal cannot escape along the length of the recess.

The apparatus 30 further comprises at least a pair of forming rollers 40, only one shown, which roll on an annular backing member 42. Each roller 40 has a profiled section 44 located between two head members 46. The profiled section 44 engages the outer surface $i$ of the workpiece. The head members 46 roll on the backing member 42. In this embodiment as with all the subsequently described embodiments, the axial length of contact between the head members 46 and the backing member 42 is greater than the axial length of contact between the profiled section 44 and the surface $i$ of the workpiece 32 and is typically four times this length.

It will be noted that the inner surfaces 48 of the outer head mmbers 46 of the forming rollers 40 form an outside wall for the recess 36 so that the recess 36 is a circumferentially enclosed recess in which the movement of the metal of the workpiece 32 is prevented in all directions.

Thus when rolling has been completed the workpiece 32 will be a precision article requiring at the most only light machining to remove flash where the forming rollers 40 and the die surface meet.

It may be that the profiling operation will be completed when the former has made one complete circuit of the workpiece. On the other hand, the kneading may be continued over several circuits. Thus, if the material being kneaded is somewhat refractory, or the shape to be imposed is especially intricate, the rolling can be continued as long as may be necessary. As the translation of former and workpiece is rotational, the only commodity expended in multiple circuits is time. The forming rollers could in any of many ways traverse the workpiece relatively, in an oscillatory path, to and fro until the workpiece has been profiled. It is, of course, the case that the former may be stationary and the workpiece 32 and die 34 move. In any case the workpiece will always be stationary on the die 34.

It should be noted that the profile imposed on the workpiece is not necessarily a smooth one. Thus, if a surface in contact with the blank, be it the surface of the profiled section 44 of the rollers 40 and the surface 50 against which the blank is pressed, or the side wall 38 be toothed, the resulting article will be a gear wheel, with internal or face teeth, as the case may be.

If the external teeth are to be rolled some mechanism is necessary to time the transits of the former, so that the last tooth rolled will merge properly into the first tooth.

FIG. 4'

Here are shown various shapes which can be rolled by the apparatus of FIG. 3'. It will be observed that the left hand shape in FIG. 4' is that which is being rolled by the apparatus of FIG. 3'.

The shapes are from left to right three particular configurations of races for thrust bearings, a bevel gear and a pipe flange. All of the shapes are readily capable of being produced by the technique of the invention to exact tolerances and without no more than nominal waste.

FIGS. 5' AND 6'

In these figures there is shown a modified arrangement of the invention. The apparatus there shown comprises a die member 52 into which a workpiece 54 is forced. The die member 52 is carried by a backing member 56 mounted in the frame 58 of the apparatus.

A plurality of forming rollers 60 are provided. Each roller 60 is generally of frusto-conical shape having a profiled portion 62 between two conical bearing heads 64.

The bearing heads 64 of each forming roller 60 run on the cylindrical surfaces 66 of a pair of supporting rollers 68 which are journaled in a holder member 70. The axial length of contact between the bearing heads and the support rollers 60 is substantially in excess of the portion of the roller 60 which is to engage the workpiece 54. The back-up members 70 are rotatable relative to and moveable towards the backing member 56 so as to cause the forming rollers 60 to roll over the workpiece 54.

The backing member 56 has a central portion 72 which projects upwardly and has a cylindrical face 74 that engages the inner surface of the annular workpiece 54.

Equi-spaced about the axis of the back-up member 70 are three side rollers 76. Each side rollers 76 is supported in line contact by a pair of backup rollers 78 (see FIG. 6'). The side rollers 76 have a profiled portion 80 formed thereon. On either side of the profiled portion are heads 82 which bear on the back-up rollers 76. The axial length of contact between the side rollers 76 and the back-up rollers 78 is substantially greater than the axial length of contact between the rollers 82 and the outer surface of the workpiece 54.

On completion of the rolling operation, the lower of the heads 82 runs against the outside face 84 of the backing member 56. Any suitable means may be provided for moving the side rollers 76 inwardly. Conveniently a conical thrust member may be provided with a frusto-conical inner surface which engages against the rollers 78 so that on axial movement of the conical thrust member downwardly these rollers 78 will be moved radially inward.

It will be noted that the side rollers 76 are offset from the forming rollers 60, therefore, there is no possibility of these parts fouling one another. Also these rollers 60 and 76 can extend substantially beyond the surfaces which they engage.

FIG. 7'

The workpiece being formed in the apparatus of the FIGS. 5' and 6' has smooth inner surface defined by the wall 74 of the backing member 56. In the apparatus of FIG. 7' on the other hand the backing member 86 is provided with an internal member 88 having teeth 90 formed on its periphery. Thus the side rollers 76 when forcing the material of the workpiece 54 inwardly cause the inside surface 92 of the workpiece 54 to deform into the space between the teeth 90 so that the workpiece 54 will be complimentarily toothed. It will be appreciated, of course, that the factors mentioned above for the deformation of the workpiece material i.e. the relationship of the total load on the side rollers 76, and their rate of feed is related to the thickness of the workpiece 54 in the proportions mentioned above.

In this embodiment also the base 94 of the recess in which the workpiece 54 is received is a profiled at 96. It will be seen, therefore, that the workpiece 54 is being profiled on four faces at right angles to each other.

It will be noted that the recess defined by the walls 74, the base 94 and the rollers 76 is a circumferentially enclosed recess.

FIG. 8'

In this figure there is shown apparatus for forming by rolling non-annular workpieces 96. Here a die 98 is provided having circumferentially enclosed die recesses into which the material of the workpiece may be forced by forming rollers 100. The rollers 100 are rolled backwards and forth by, and bear against, an oscillating backing plate 102. The rollers 100 are profiled and have portions 104 that roll in line contact with the oscilating back-up plate 102 and, when the workpiece 96, is fully homed in its recess, on the front face of the die 98. As in all the embodiments hereinbefore described the forming rollers 100 used in this apparatus must be identical so that each follows up the impression made by its predecessors.

If desired the shape applied to the profiled part of the roller former 100 may be not a surface of the revolution. Thus the sides of the workpiece 96 being rolled by this profiled portion may have e.g. converging sides and being of varying depth.

In the circumstances, it will be appreciated that the forming rollers 100 must be accurately located and that the oscillating plate 102 must oscillate through a sufficient length for the entire profile to be applied to the upper end of the workpiece. Further the forming roller 100 must be not only identical but so arranged that each roller follows up the impression made by its predecessors. The forming rollers 100 and the die 98 may be kept in the correct relative positions by means such as a rack on the die 98 and pinions on the forming roller 100. Another rack may be provided on the oscillating plate 102 so as to minimise the possibility of slippage.

The workpieces 92 may be slugs or blanks placed one within each die recess as is shown. However, the blank may be flat bars or plates which are so worked by the roller 100 that their metal content flows into the die recesses and are at the same time have the profile of the roller imposed upon them.

As in conventional forging techniques provision has been made for the ejection of the formed articles from the die recess and the article must be demountable.

In a modification of the arrangement of FIG. 9, the roller 100 may be moved, in operation, in one direction only, the return movement being an idling action. With such arrangement the forming rollers may be arranged as a group of progressively increasing depth. Here the increasing depth corresponds to the amount of feed.

FIG. 9'

In this arrangement instead of the forming rollers 100 being supported directly on the oscillating plate 102, the forming rollers 100 are rotatably carried between a pair of back-up rollers 106 which themselves roll on a back-up plate 108. The back-up rollers 106 are connected together by a chain 110 which is connected to power driving means (not shown) for moving the rollers 100 as desired and as explained with reference to the preceeding embodiment.

The die may be curvilinear as well as planar and in this context reference is made to my co-pending patent application Ser. No. 889,626 filed Dec. 31, 1969, and which is also a continuation in part of my U.S. Patent application Ser. No. 615,613.

FIGS. 10' and 11'

A modified roller for use in accordance with the invention is shown in FIGS. 10' and 11'. In these Figures a workpiece 110 is laid on a die 112 which has therein peripherally enclosed recesses (not shown). The roller 114 comprises a shaft 116 on which is rotatably mounted a backing roller 118 through the intermediary of needle or like roller bearings 120. The ends 122 of the shaft 116 are carried in bearing sleeves 124 and 126, the outer 126 of which run on back-up surfaces 128. A number of forming rollers 130 orbit around the back-up roller 118. A cage or the like may be provided to guide these forming rollers 130 in so orbiting. The forming rollers 130 may be profiled and if desired ahead of these forming rollers 130 may form one wall of a peripherally enclosed recess in the die 112.

FIGS. 12' AND 13'

If desired the forming rollers may comprise balls or rollers 132 contained in recesses in a back-up member 136. The device provided by this type of former 140 can scan over the entire surface of a workpiece 142. This roller system can be used to scan the surface of the workpiece in other words it may move axially after each pass.

FIGS. 14', 15', 16', 17' AND 18'

In FIGS. 17' and 18' there is shown apparatus for forming a bumper 160 as shown in the three preceeding Figures. Here there is a die 144 which has a central portion 146 that stands proud and is shaped as will be described. The forming rollers 148 orbit around the backing roller 150 as it moves along a contoured surface 152 of a backing member 154. The arrangement of the forming rollers 148, the backing roller 150 and the backing member 154 is similar to that described with reference to and illustrated in FIGS. 14' and 15'. The forming rollers 148 have a profiled centre portion two radially extending surfaces 157 and a curved portion 156 which corresponds to the outside surface 158 of a bumber 160 being rolled.

The back-up roller 150 has a raised central portion 162 which fits this profiled surface so that the forming roller 148 is supported over its entire axial length by the back-up roller 150. It will be appreciated of course, that this axial length of support is greater than the length of contact between the profiled roller and the bumper.

The projection 146 has a number of longitudinal extending recesses 166, 168, 170 corresponding to the longitudinal ribs 174, 176 and 178 on the rear face 164 of the bumper 16 and transverse recesses 172 which correspond to the transverse ribs 180 on this face 164. At the points corresponding to the end of the bumper there are end pieces 182 projecting from the die 144.

When the workpiece has been placed on the projection 146 it will be seen that a circumferentially enclosed recess is provided defined by the radial walls 157 of the profiled portion of the rollers 148, the surface of the projection 146 and the projections 182 at its ends.

Techniques available in the forging art may be used for the removal of the bumper from the die 144. With this apparatus, is possible to produce stainless steel bumpers because of the light weight of the bumper that is being produced. Further the need for polishing the outside surface 158 of the bumper 160 is obviated because of the burnishing effect which the rollers 148 have on the surface 158. Because the bumper 160 is reinforced by the ribs or projections 174, 176, 178 and 180, the bumper requires less than half the metal to achieve the same strength the similar characteristics of conventionally prepared bumpers.

FIGS. 19' and 20'

In these figures a die 184 has a honeycombed peripherally enclosed recess 186. The metal of a mild steel blank 188 is caused to flow into this recess 186 by a rolling device 190 which is in the same form as that of the described with reference to and illustrated in FIGS. 10' and 11'. The article thus rolled may be used e.g. in the building technology. Plastics or other light material may be headed into the recesses formed between the ribs for heat and or noise and or other insulation properties. Other metals or materials may also be inserted into these recesses in the article. The die 184 may be tailor made by having recesses for e.g. lugs and the like so that these are formed on the article being rolled.

I claim:

1. A method of high pressure forming a metal workpiece by progressive plastic deformation from a metal blank having two opposite surfaces and utilising (i) die means with a die face having at least one recess therein, (ii) a roller, and (iii) means of backing up the roller; the method comprising (a) laying the blank on the die means so that it lies wholly to one side of the roller axis and with one of the said surfaces of the blank resting on the die means and overlying the recess, (b) with the blank stationary relative to the die, rolling the roller over the other surface of the blank while applying so great a force to the means of backing up the roller in a direction generally at right angles to the die face that the metal of the blank at the first-mentioned surface flows to enter the recess, and (c) progressively rolling said blank to substantially fill the recess at a time when the roller is still spaced from the die, thereby to reduce the thickness of the portion of said blank that overlies the die face outside said recess and to cause said portion to conform to the die face.

2. A method as claimed in claim 1 further comprising passing a plurality of rollers sequentially over the blank.

3. A method as claimed in claim 1 comprising oscillating the roller so that it moves back and forth over the blank.

4. A method as claimed in claim 1 comprising moving the roller in the same direction throughout the rolling operation.

* * * * *